(12) United States Patent
Israr et al.

(10) Patent No.: US 12,534,664 B1
(45) Date of Patent: Jan. 27, 2026

(54) AQUEOUS INJECTION FLUID AND METHOD FOR SULFATE SCALE INHIBITION IN SUBTERRANEAN FORMATIONS

(71) Applicant: King Fahd University of Petroleum and Minerals, Dhahran (SA)

(72) Inventors: Muhammad Israr, Dhahran (SA); Mobeen Murtaza, Ashariqya (SA); Syed Muhammad Shakil Hussain, Dhahran (SA); Muhammad Shahzad Kamal, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/215,103

(22) Filed: May 21, 2025

(51) Int. Cl.
*C09K 8/532* (2006.01)

(52) U.S. Cl.
CPC .................... *C09K 8/532* (2013.01)

(58) Field of Classification Search
CPC .................................................. C09K 8/532
See application file for complete search history.

(56) References Cited

U.S. PATENT DOCUMENTS

| | | | |
|---|---|---|---|
| 2008/0188636 | A1 | 8/2008 | Argyropoulos et al. |
| 2018/0135187 | A1 | 5/2018 | Crawford et al. |

FOREIGN PATENT DOCUMENTS

| | | |
|---|---|---|
| CN | 104650838 A | 5/2015 |
| CN | 114806529 A | 7/2022 |

OTHER PUBLICATIONS

Israr (M. Israr, et al., Structural insights into pyridinium-based dicationic surfactants at harsh conditions: Influence of spacer groups on thermal stability and surface properties, Heliyon 11 (2025) e42625).*
Devi (Y.G. Devi et al., Impacts of pyridinium gemini surfactants on corrosion inhibition of carbon steel, Surfaces and Interfaces 45 (2024) 103796).*
M.M. Shaban, at al., "Novel trimeric cationic pyrdinium surfactants as bi-functional corrosion inhibitors and antiscalants for API 5L X70 carbon steel against oilfield formation water", Journal of Molecular Liquids, vol. 305, May 1, 2020, 92 pages.

* cited by examiner

*Primary Examiner* — Kumar R Bhushan
(74) *Attorney, Agent, or Firm* — Oblon, McClelland, Maier & Neustadt, L.L.P.

(57) ABSTRACT

An aqueous injection fluid for treatment of a subterranean hydrocarbon-bearing formation includes water and at least one water soluble cationic surfactant having a general formula (DCS):

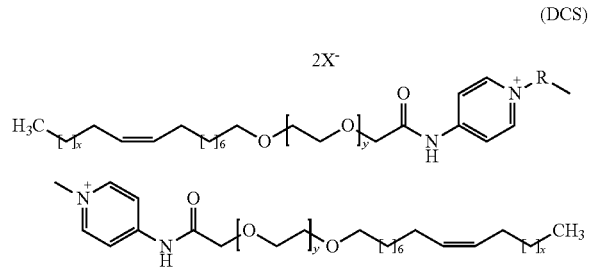

where 'R' is $C_2$-$C_4$ alkylene which may have one or more —O—, —S— or —S(O)$_2$O— groups, 'X$^-$' is halide, 'x' is an integer of from 2 to 10 and, 'y' is an integer of from 2 to 10.

18 Claims, 2 Drawing Sheets

After 1 Day

After 7 Days

After 1 Day

After 7 Days

AQUEOUS INJECTION FLUID AND METHOD FOR SULFATE SCALE INHIBITION IN SUBTERRANEAN FORMATIONS

BACKGROUND

Technical Field

The present disclosure relates to petroleum engineering and chemical treatment compositions for oil and gas production systems. More particularly, the present disclosure pertains to an aqueous injection fluid including water-soluble di-cationic surfactants formulated for the inhibition of sulfate scale formation and a method for sulfate scale inhibition, especially in subterranean hydrocarbon-bearing geologic formations.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

In the oil and gas industry, accumulation of mineral scale within wellbores, pipelines, and production infrastructure presents a persistent operational challenge [See: Murtaza, M.; Alarifi, S. A.; Rasm, M. Y.; Kamal, M. S.; Mahmoud, M.; Al-Ajmi, M. *Single step calcium sulfate scale removal at high temperature using tetrapotassium ethylenediaminetetraacetate with potassium carbonate Scientific Reports* 123AD, 12, 10085]. The aforesaid solid deposits originate from the precipitation of sparingly soluble inorganic salts, which typically occurs as a consequence of changes in thermodynamic or compositional conditions such as temperature, pressure, or fluid chemistry, within the production system [See: Wang, H.; Hu, J.; Yang, Z.; Yin, Z.; Xiong, Q.; Zhong, X. *The study of a highly efficient and environment-friendly scale inhibitor for calcium carbonate scale in oilfields Petroleum* 2021, 7 (3), 325-334]. The resultant scale formation is known to reduce flow capacity, impair equipment functionality, increase maintenance frequency, and adversely impact hydrocarbon recovery efficiency [See: Vazirian, M. M.; Charpentier, T. V. J.; de Oliveira Penna, M.; Neville, A. *Surface inorganic scale formation in oil and gas industry: as adhesion and deposition processes J Pet Sci Eng* 2016, 137, 22-32].

Among a plurality of mineral scale encountered in petroleum operations, calcium sulfate ($CaSO_4$) and barium sulfate ($BaSO_4$) represent two of the most problematic mineral scales. The sulfate-based scales are particularly prevalent in offshore and high-pressure, high-temperature (HPHT) environments, where sulfate-rich injection fluids such as seawater are employed in enhanced oil recovery (EOR) operations [See: Bader, M. S. H. *Sulfate scale problems in oil fields water injection operations Desalination* 2006, 201 (1-3), 100-105]. In such cases, mixing of injected seawater containing sulfate ions with formation water rich in divalent cations such as $Ca^{2+}$, $Ba^{2+}$, or $Sr^{2+}$ leads to the precipitation of scale under supersaturated conditions. The scaling is further exacerbated under elevated thermal and pressure regimes, where solubility thresholds are altered.

Calcium sulfate scale exists in three polymorphic forms, gypsum ($CaSO_4 \cdot 2H_2O$), hemihydrate ($CaSO_4 \cdot 0.5H_2O$), and anhydrite ($CaSO_4$). Gypsum predominantly forms at temperatures below 100° C., whereas anhydrite formation is favoured at temperatures exceeding 100° C. [See: Fatemeh, S.; Ardakani, G.; Seyed; Hosseini, T.; Kazemzadeh, Y. *A review of scale inhibitor methods during modified smart water injection Can. J. Chem. Eng.*, Volume 102, Issue 11, November 2024, 3922-3952]. The scales may deposit within various segments of the production system, including downhole tubing, surface facilities, injection wells, and in the near-wellbore region, complicating both production and reinjection operations.

Historically, the mitigation of sulfate scale has relied on post-deposition removal techniques, including mechanical descaling methods such as hydraulic jetting, and chemical dissolution using acids or chelating agents [See: Fernandes, R. S.; Beserra, N. L. R.; Souza, M. A. F.; Lima, D. F.; Castro, B. B.; Balaban, R. C. *Experimental and theoretical investigation of a copolymer combined with surfactant for preventing scale formation in oil wells J Mol Liq* 2020, 318, 114036]. Although the methods may provide partial remediation, they exhibit several critical limitations. Mechanical methods are labour-intensive and pose operational risks. Chemical treatments often require repeated application, are subject to thermal decomposition at elevated reservoir temperatures, and may raise environmental compliance concerns due to the disposal of spent chemicals. Additionally, the efficacy of conventional inhibitors tends to decrease under HPHT conditions, rendering them suboptimal for advanced production environments.

Given the limitations associated with removal-based approaches, emphasis has increasingly shifted toward the preventive inhibition of scale formation. Inhibition strategies seek to interfere with nucleation and crystal growth processes, reducing the likelihood of scale deposition in the first instance. Among chemical inhibitors, surfactants have garnered attention for an ability to alter surface tension and interfere with the crystallization kinetics of mineral salts. The amphiphilic nature of surfactants allows the surfactants to adsorb at solid-liquid interfaces and impede scale growth through mechanisms such as crystal habit modification and dispersion stabilization.

Despite the theoretical advantages of surfactant-based inhibition, practical application has been constrained by challenges related to thermal stability, compatibility with reservoir fluids, and long-term solubility under field conditions. Moreover, the availability of cost-effective, environmentally acceptable, and thermally stable surfactant formulations suitable for HPHT oilfield environments remains limited.

Hence, there remains a critical requirement for the development of chemically stable, seawater-soluble, and field-deployable scale inhibitors that are capable of sustaining performance under high-temperature reservoir conditions. Accordingly, one object of the present disclosure is to provide an aqueous injection fluid for the treatment of a subterranean hydrocarbon-bearing formation, that may circumvent the above specified drawbacks and limitation of the methods known in the art.

SUMMARY

In an exemplary embodiment, an aqueous injection fluid for treatment of a subterranean hydrocarbon-bearing formation is disclosed. The aqueous injection fluid includes water and at least one water soluble cationic surfactant having a general formula (DCS):

(DCS)

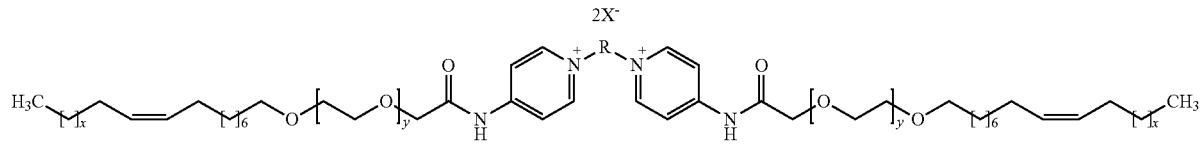

Where 'R' is $C_2$-$C_4$ alkylene which may have one or more —O—, —S— or —S(O)$_2$O— groups, 'X$^-$' is halide, 'x' is an integer of from 2 to 10 and, 'y' is an integer of from 2 to 10.

In some embodiments, the water is at least one selected from the group consisting of fresh water, seawater, brackish water, and formation water.

In some embodiments, the injection fluid has a total dissolved solids content of at least about 50000 parts per million by weight.

In some embodiments, the injection fluid has a total dissolved solids content of from about 50000 to about 300000 parts per million by weight.

In some embodiments, the water soluble cationic surfactant (DCS) has a critical micelle concentration of from about 0.015 millimole per liter (mmolL$^{-1}$) to about 0.025 mmolL$^{-1}$.

In some embodiments, the water soluble cationic surfactant (DCS) has a thermal degradation temperature of at least about 250° C., as determined by thermogravimetric analysis (TGA).

In some embodiments, the water soluble cationic surfactant (DCS) has a thermal degradation temperature of from about 250° C. to about 300° C., as determined by TGA.

In some embodiments, the water soluble cationic surfactant (DCS) has a thermal degradation temperature of from about 270° C. to about 300° C., as determined by TGA.

In some embodiments, the concentration of the at least one water soluble cationic surfactant (DCS) is from about 50 to about 2500 parts per million by weight.

In some embodiments, the concentration of the at least one water soluble cationic surfactant (DCS) is from about 50 to about 1500 parts per million by weight.

In some embodiments, 'R' is $C_2$-$C_4$ alkylene, 'X$^-$' is Cl$^-$ or Br$^-$, 'x' is an integer of from 3 to 10 and, 'y' is an integer of from 3 to 10.

In some embodiments, X$^-$ is Br$^-$.

In some embodiments, 'R' is $C_2$-$C_4$ alkylene which is interrupted by —O—, 'X$^-$' is Cl$^-$ or Br$^-$ 'x' is an integer of from 3 to 10 and, 'y' is in an integer of from 3 to 10.

In some embodiments, X$^-$ is Br$^-$.

In another exemplary embodiment, a method for inhibiting sulphate scale formation in a well-bore disposed in a hydrocarbon-bearing subterranean formation is described. The method includes injecting into the well-bore an aqueous injection fluid as defined above.

In some embodiments, the well-bore has a static bottom hole temperature of at least about 100° C.

In some embodiments, the well-bore has a static bottom hole temperature of at least about 150° C.

In some embodiments, the well-bore has a bottom hole pressure of at least about 69 MPa.

In some embodiments, the well-bore has a bottom hole pressure of from about 69 to about 138 MPa.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
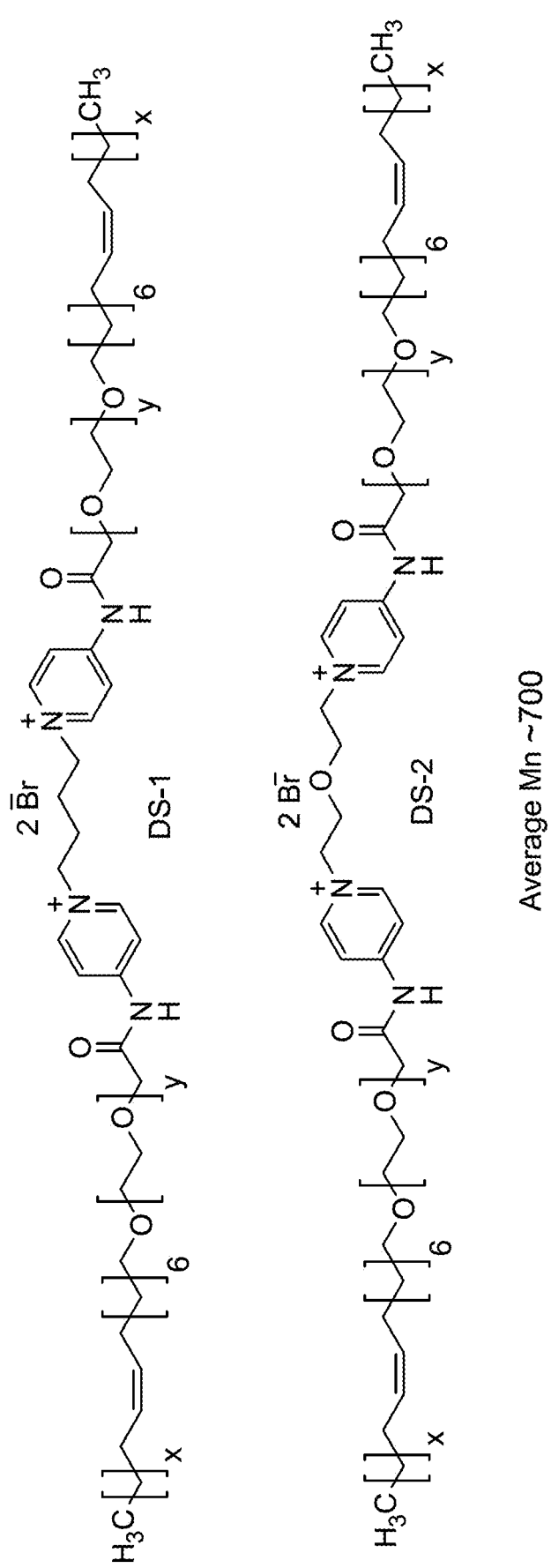
FIG. 1 illustrates a chemical structure of DS-1 and DS-2 dicationic surfactants, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, reference numerals designate identical or corresponding parts throughout several views. Further, as used herein, the words 'a', 'an' and the like generally carry a meaning of 'one or more,' unless stated otherwise.

Furthermore, the terms 'approximately', 'approximate', 'about', and similar terms generally refer to ranges that include the identified value within a margin of 20%, 10%, or preferably 5%, and any values therebetween.

As used herein, the term 'aqueous injection fluid' refers to a water-based solution utilized in subterranean formations, typically including water mixed with various additives such as salts, acids, or surfactants, to facilitate processes like enhanced oil recovery or scale inhibition.

The term 'subterranean hydrocarbon-bearing formation' refers to a naturally occurring geological structure located beneath the earth's surface that contains significant quantities of hydrocarbons, such as oil or natural gas, within its pore spaces.

The term 'surfactant' refers to a chemical compound that, when added to a liquid, reduces its surface tension, thereby increasing its spreading and wetting properties.

Cationic surfactants have cationic functional groups at their head, such as primary and secondary amines. The cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

The term 'water-soluble cationic surfactant' refers to a surfactant that possesses a positively charged hydrophilic (water-attracting) head and is soluble in water, commonly used in various applications, including cleaning and conditioning.

The term 'alkylene' refers to a bivalent saturated aliphatic radical, such as ethylene, regarded as derived from an alkene by opening of the double bond or from an alkane by removal of two hydrogen atoms from different carbon atoms.

The term 'halide' refers to a binary compound of a halogen with a more electropositive element or radical.

The term 'total dissolved solids content' refers to the measure of the dissolved combined content of all inorganic and organic substances present in a liquid in molecular, ionized, or micro-granular (colloidal sol) suspended form.

The term 'critical micelle concentration' refers to the concentration of surfactants above which micelles form, and all additional surfactants added to the system will form micelles.

The term 'thermal degradation temperature' refers to the temperature at which a substance undergoes chemical decomposition due to the application of heat.

The term 'sulphate scale' refers to the accumulation of mineral deposits, primarily consisting of calcium sulfate ($CaSO_4$) and barium sulfate ($BaSO_4$), that form in production systems due to the precipitation of these compounds from incompatible fluids.

The term 'static bottom hole temperature' refers to the temperature measured at the bottom of a well when no fluid is circulating, indicating the formation temperature.

The term 'bottom hole pressure' refers to the pressure measured at the bottom of a well, which is influenced by factors such as the weight of the fluid column and the pressure within the subterranean formation.

Aspects of the present disclosure are directed to an approach for mitigating sulfate scale formation in high-pressure, high-temperature oil and gas production systems using locally synthesized pyridinium-based dicationic surfactants, referred to as DS-1 and DS-2. In the present disclosure, these surfactants are evaluated for their ability to inhibit the precipitation of calcium and barium sulfate, which are known to obstruct fluid flow and damage equipment. The surfactants are tested under controlled conditions using a static bottle test to assess their performance in preventing scale formation. The results demonstrate that both surfactants are thermally stable, seawater-soluble, and capable of significantly reducing scale deposition. Among them, DS-1 showed superior performance in maintaining scale-free conditions. This approach offers a cost-effective, environmentally friendly alternative to traditional scale management techniques, supporting more sustainable operational practices in the oil and gas industry.

An aqueous injection fluid for the treatment of a subterranean geological formation. The subterranean geological formation may include, but is not limited to, a depleted oil reservoir, a depleted gas reservoir, a sour reservoir, a hydrocarbon-bearing subterranean formation, a saline formation, or an un-minable coal bed. The aqueous injection fluid for the treatment of a subterranean hydrocarbon-bearing formation. The aqueous injection fluid includes water and at least one water soluble cationic surfactant having the general formula (DCS):

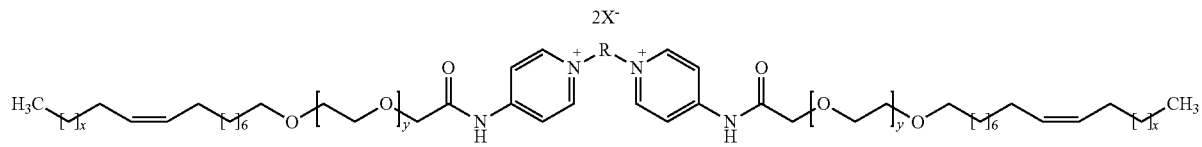

(DCS)

Where R is C2-C4 alkylene which may have one or more —O—, —S— or —S(O)2O— groups, X— is halide, X— may be F—, Cl—, Br—, I—, At—, x is an integer of from 2, preferably 3, preferably 4, preferably 5, preferably 6, preferably 7, preferably 8, preferably 9; and y is an integer of from 2, preferably 3, preferably 4, preferably 5, preferably 6, preferably 7, preferably 8, preferably 9. X is an integer of from 2 to 10. R is C2-C4 alkylene, X— is Cl— or Br—; X— is Br—, x is an integer of from 3 to 10, and y is an integer of from 3 to 10. R is C2-C4 alkylene which is interrupted by —O—, X— is Cl— or Br—; where X— is Br—, x is an integer of from 3 to 10, y is in an integer of from 3 to 10.

In some embodiments, the water may be tap water, distilled water, bi-distilled water, deionized water, deionized distilled water, reverse osmosis water, hard water, fresh water, brine/salt water, the hard water, and the freshwater may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The water is at least one selected from fresh water; seawater, brackish water; and formation water. In an embodiment, seawater includes a variety of dissolved salts such as sodium chloride at 41.172 grams per Liter (g/L), magnesium chloride hexahydrate at 17.644 g/L, and sodium sulfate at 6.339 g/L. Additionally, calcium chloride dihydrate is present at about 2.387 g/L, and sodium bicarbonate at 0.165 g/L. In another embodiment, formation water includes a variety of dissolved salts such as sodium chloride at 150.446 g/L and calcium chloride dihydrate at 69.841 g/L. Sodium bicarbonate and sodium sulfate are also present in smaller quantities at 0.487 g/L and 0.518 g/L respectively, while magnesium chloride hexahydrate is found at 20.396 g/L.

In some embodiments, the aqueous injection fluid has a total dissolved solids content of at least about 50000 parts per million (ppm), preferably 60,000 ppm, 70,000 ppm, preferably 80,000 ppm, 90,000 ppm, preferably 100,000 ppm, 110,000 ppm, preferably 120,000 ppm, 130,000 ppm, preferably 140,000 ppm, 150,000 ppm, preferably 160,000 ppm, 170,000 ppm, preferably 180,000 ppm, 190,000 ppm, preferably 200,000 ppm, 210,000 ppm, preferably 220,000 ppm, 230,000 ppm, preferably 240,000 ppm, 250,000 ppm, preferably 260,000 ppm, 270,000 ppm, preferably 280,000 ppm, 290,000 ppm, by weight. In some embodiments, the aqueous injection fluid has a total dissolved solids content of from about 50000 to about 300000 parts per million (ppm) by weight. In some embodiments, the aqueous injection fluid has a total dissolved solids content of from about 50000 to about 300000 parts per million (ppm) by weight. In an embodiment, the seawater has a total dissolved solids content of 67707 ppm. In another embodiment, the freshwater has a total dissolved solids content of preferably 241688 ppm by weight.

In some embodiments, the water soluble cationic surfactant (DCS) has a critical micelle concentration of from about preferably 0.015 millimoles per liter (mmolL$^{-1}$), preferably 0.016 mmolL$^{-1}$, preferably 0.017 mmolL$^{-1}$, 0.018 mmolL$^{-1}$, preferably 0.019 mmolL$^{-1}$, 0.020 mmolL$^{-1}$, preferably 0.021 mmolL$^{-1}$, 0.022 mmolL$^{-1}$, preferably 0.023 mmolL$^{-1}$, 0.024 mmolL$^{-1}$. In some embodiments, the water soluble cationic surfactant (DCS) has a critical micelle concentration of from about 0.015 to about 0.025 mmolL$^{-1}$, preferably 0.019 mmolL$^{-1}$, preferably 0.016 mmolL$^{-1}$.

In some embodiments, the water-soluble cationic surfactant (DCS) has a thermal degradation temperature of at least about 250° C., as determined by Thermogravimetric Analysis (TGA). In some embodiments, the water soluble cationic surfactant (DCS) has a thermal degradation temperature of from about 250° C., preferably about 251° C., preferably about 252° C., preferably about 253° C., preferably about 254° C., preferably about 255° C., preferably about 256° C., preferably about 257° C., preferably about 258° C., preferably about 259° C., preferably about 260° C., preferably about 261° C., preferably about 262° C., preferably about 263° C., preferably about 264° C., preferably about 265° C., preferably about 266° C., preferably about 267° C., preferably about 268° C., preferably about 269° C., preferably about 270° C., preferably about 271° C., preferably about 272° C., preferably about 273° C., preferably about 274° C., preferably about 275° C., preferably about 276° C., preferably about 277° C., preferably about 278° C., preferably about 279° C., preferably about 280° C., preferably about 281° C., preferably about 282° C., preferably about 283° C., preferably about 284° C., preferably about 285° C., preferably about 286° C., preferably about 287° C., preferably about 288° C., preferably about 289° C., preferably about 290° C., preferably about 291° C., preferably about 292° C., preferably about 293° C., preferably about 294° C., preferably about 295° C., preferably about 296° C., preferably about 297° C., preferably about 298° C., preferably about 299° C. In some embodiments, the water soluble cationic surfactant (DCS) has a thermal degradation temperature of from about 250° C. to about 300° C., preferably from about 270° C. to about 300° C., preferably 282° C., preferably 280° C. as determined by TGA. as determined by TGA.

In some embodiments, the concentration of at least one water soluble cationic surfactant (DCS) is from about 50 ppm by weight, preferably about 100 ppm by wt., preferably about 150 ppm by wt., preferably about 200 ppm by wt., preferably about 250 ppm by wt., preferably about 300 ppm by wt., preferably about 350 ppm by wt., preferably about 400 ppm by wt., preferably about 450 ppm by wt., preferably about 500 ppm by wt., preferably about 550 ppm by wt., preferably about 600 ppm by wt., preferably about 650 ppm by wt., preferably about 700 ppm by wt., preferably about 750 ppm by wt., preferably about 800 ppm by wt., preferably about 850 ppm by wt., preferably about 900 ppm by wt., preferably about 950 ppm by wt., preferably about 1000 ppm by wt., preferably about 1050 ppm by wt., preferably about 1100 ppm by wt., preferably about 1150 ppm by wt., preferably about 1200 ppm by wt., preferably about 1250 ppm by wt., preferably about 1300 ppm by wt., preferably about 1350 ppm by wt., preferably about 1400 ppm by wt., preferably about 1450 ppm by wt., preferably about 1500 ppm by wt., preferably about 1550 ppm by wt., preferably about 1600 ppm by wt., preferably about 1650 ppm by wt., preferably about 1700 ppm by wt., preferably about 1750 ppm by wt., preferably about 1800 ppm by wt., preferably about 1850 ppm by wt., preferably about 1900 ppm by wt., preferably about 1950 ppm by wt., preferably about 2000 ppm by wt., preferably about 2050 ppm by wt., preferably about 2100 ppm by wt., preferably about 2150 ppm by wt., preferably about 2200 ppm by wt., preferably about 2250 ppm by wt., preferably about 2300 ppm by wt., preferably about 2350 ppm by wt., preferably about 2400 ppm by wt., preferably about 2450 ppm by wt. In some embodiments, the concentration of at least one water-soluble cationic surfactant (DCS) is from about 50 to about 2500 ppm by weight. In some embodiments, the concentration of at least one water-soluble cationic surfactant (DCS) is from about 50 to about 1500 ppm by wt., preferably 100 ppm by wt, and preferably 1000 ppm by weight.

A method for inhibiting sulphate scale formation in a well-bore disposed in the subterranean hydrocarbon-bearing formation. The aqueous injection fluid can be used to remove scales/can be applied on surfaces that are prone to scale formation. The surface includes a natural surface (e.g., geological surface, surface of an oil and/or gas reservoir) or a surface of artificially placed or deliberately introduced materials (e.g., wellbore equipment) whose surface is also prone to scale deposition, or a surface in a subterranean formation. However, the removal of scale from other surfaces of the type disclosed herein is also contemplated. In some embodiments, the aqueous injection fluid can be used for the removal of at least a portion of scale/prevent scale formation from the wellbore equipment (e.g., downhole equipment, surface equipment associated with the wellbore) surfaces that are in fluid communication with the wellbore and/or subterranean formation such that fluids (e.g., produced fluids) traveling to and/or from the wellbore and/or subterranean formation contact said surfaces. Non-limiting examples of wellbore equipment that might accumulate scale on one or more surfaces include heating turbines, heat exchangers, safety valves, casings, production tubing, mandrels, pipes, separators, pumps, tubulars, vessels, completion equipment (e.g., screens, etc.), downhole tools and any other piece of equipment that might come in contact with a wellbore fluid, whether such fluid is produced or part of a servicing fluid.

The method includes injecting into the well-bore an aqueous injection fluid. In one or more embodiments, the wellbore is present in at least one of an oil well, a gas well, a production well, an injection well, a naturally flowing well, an artificially lifted well, a high-temperature well, a steam-assisted gravity drainage well, a steam injector well, or a geothermal well. The wellbore may be formed in the subterranean hydrocarbon-bearing formation by known techniques. In some embodiments, the well may be a horizontal well, a vertical well, or a multilateral well.

In an embodiment, the well-bore has a static bottom hole temperature of at least about 100° C., preferably about 102° C., preferably about 103° C., preferably about 104° C., preferably about 105° C., preferably about 106° C., preferably about 107° C., preferably about 108° C., preferably about 109° C., preferably about 110° C., preferably about 111° C., preferably about 112° C., preferably about 113° C., preferably about 114° C., preferably about 115° C., preferably about 116° C., preferably about 117° C., preferably about 118° C., preferably about 119° C., preferably about 120° C., preferably about 121° C., preferably about 122° C., preferably about 123° C., preferably about 124° C., preferably about 125° C., preferably about 126° C., preferably about 127° C., preferably about 128° C., preferably about 129° C., preferably about 130° C., preferably about 131° C., preferably about 132° C., preferably about 133° C., preferably about 134° C., preferably about 135° C., preferably about 136° C., preferably about 137° C., preferably about 138° C., preferably about 139° C., preferably about 140° C., preferably about 141° C., preferably about 142° C., preferably about 143° C., preferably about 144° C., preferably about 145° C., preferably about 146° C., preferably about 147° C., preferably about 148° C., preferably about 149° C. In an embodiment, the well-bore has a static bottom hole temperature of at least about 150° C.

In an embodiment, the well-bore has a bottom hole pressure of at least about 69 mega pascals (MPa), preferably 70 MPa, preferably 71 MPa, preferably 72 MPa, preferably 73 MPa, preferably 74 MPa, preferably 75 MPa, preferably 76 MPa, preferably 77 MPa, preferably 78 MPa, preferably 79 MPa, preferably 80 MPa, preferably 81 MPa, preferably 82 MPa, preferably 83 MPa, preferably 84 MPa, preferably 85 MPa, preferably 86 MPa, preferably 87 MPa, preferably 88 MPa, preferably 89 MPa, preferably 90 MPa, preferably 91 MPa, preferably 92 MPa, preferably 93 MPa, preferably 94 MPa, preferably 95 MPa, preferably 96 MPa, preferably 97 MPa, preferably 98 MPa, preferably 99 MPa, preferably 100 MPa, preferably 101 MPa, preferably 102 MPa, preferably 103 MPa, preferably 104 MPa, preferably 105 MPa, preferably 106 MPa, preferably 107 MPa, preferably 108 MPa, preferably 109 MPa, preferably 110 MPa, preferably 111 MPa, preferably 112 MPa, preferably 113 MPa, preferably 114 MPa, preferably 115 MPa, preferably 116 MPa, preferably 117 MPa, preferably 118 MPa, preferably 119 MPa, preferably 120 MPa, preferably 121 MPa, preferably 122 MPa, preferably 123 MPa, preferably 124 MPa, preferably 125 MPa, preferably 126 MPa, preferably 127 MPa, preferably 128 MPa, preferably 129 MPa, preferably 130 MPa, preferably 131 MPa, preferably 132 MPa, preferably 133 MPa, preferably 134 MPa, preferably 135 MPa, preferably 136 MPa, preferably 137 MPa. In an embodiment, the well-bore has a bottom hole pressure of about 69 to about 138 MPa.

In some embodiments, the aqueous injection fluid may include any suitable additives. Exemplary additives include, but are not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, and so on. A person of ordinary skill in the art, with the benefit of this disclosure, will recognize the types and suitable amounts of additives that may be included in the aqueous injection fluid for a particular application, without undue experimentation.

EXAMPLES

The following examples demonstrate an aqueous injection fluid for the treatment of a subterranean hydrocarbon-bearing formation. The examples are provided solely for illustration and are not to be construed as limitations of the present disclosure, as many variations thereof are possible without departing from the spirit and scope of the present disclosure.

Example 1: Materials and Methods

According to the present disclosure, two pyridinium-based di-cationic surfactants, hereinafter referred to as DS-1 and DS-2, were synthesized for evaluation as scale inhibitors in high-salinity and high-temperature environments. The chemical structures of DS-1 and DS-2 are depicted in FIG. 1. The functional groups present in DS-1 include an amide moiety, a quaternary pyridinium ring, and a sulfonate group. Further, DS-2 includes amide and quaternary pyridinium functionalities in addition to an ether linkage. The molecular weights of DS-1 and DS-2 were determined to be 1608.11 grams per mole (g/mol) and 1624.14 g/mol, respectively.

The DS-1 and DS-2 surfactants exhibited favourable physicochemical characteristics that support an application thereof as scale inhibitors in oilfield systems. DS-1 and DS-2 were found to be soluble in distilled water, seawater, and synthetic formation water. The critical micelle concentration (CMC) values were calculated to be 0.019 mmol·$L^1$ for DS-1 and 0.016 mmol·$L^{-1}$ for DS-2, suggesting strong surfactant efficiency and micelle formation capacity.

Thermogravimetric analysis (TGA) indicated high thermal stability, with decomposition temperatures measured at 282° C. for DS-1 and 280° C. for DS-2, rendering the surfactants suitable for high-temperature subsurface applications.

In order to simulate field-relevant scaling conditions, two synthetic brine solutions were prepared to represent seawater (SW) and formation water (FW). The total dissolved solids (TDS) concentrations in the SW and FW were determined to be 67,707 ppm and 241,688 ppm, respectively, as listed in Table 1. An incompatibility scenario was created by mixing equal volumes of SW and FW in a 1:1 ratio, inducing supersaturation conditions conducive to sulfate scale formation. As such, scale inhibition tests were conducted by introducing the surfactants into the mixed brine system at two concentrations including 100 ppm and 1000 ppm. The solutions were incubated at 90° C. for a period of seven days to assess the performance of the surfactants under high-temperature conditions. The inhibition efficiency was determined by visual inspection and quantification of scale formation, as described in the following test protocols.

TABLE 1

Composition of SW and FW

| Salts | Seawater (g/L) | Formation Water (g/L) |
|---|---|---|
| $NaHCO_3$ | 0.165 | 0.487 |
| $Na_2SO_4$ | 6.339 | 0.518 |
| NaCl | 41.172 | 150.446 |
| $CaCl_2 \cdot 2H_2O$ | 2.387 | 69.841 |
| $MgCl_2 \cdot 6H_2O$ | 17.644 | 20.396 |

The solubility and thermal stability of surfactants are critical parameters influencing a suitability of the surfactants for deployment in oilfield environments, particularly under high-temperature conditions. Many commercially available surfactants undergo hydrolysis upon exposure to elevated temperatures, with prolonged thermal stress accelerating a degradation of the surfactants. Further, surfactants exhibiting thermal instability are generally unsuitable for use in subterranean applications where long-term stability is required. Thermogravimetric analysis (TGA) was employed to evaluate the thermal decomposition characteristics of the synthesized dicationic surfactants. The degradation temperatures of DS-1 and DS-2 were determined to be 282° C. and 280° C., respectively, which are substantially higher than the temperature ranges typically encountered in reservoir conditions.

Figure 2A:
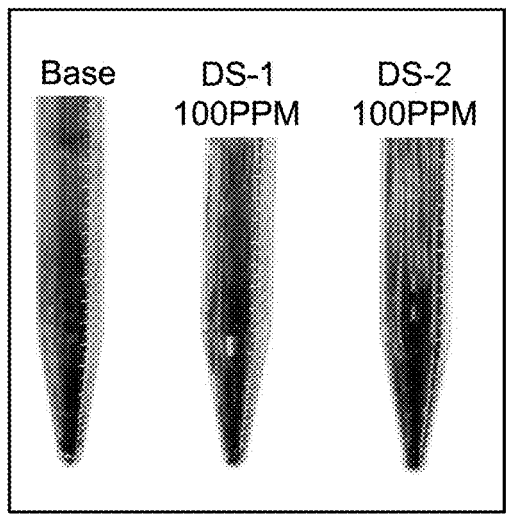
FIG. 2A illustrate sequential photographs documenting a visual progression of scale formation in a presence of dicationic surfactants at a concentration of 100 ppm, after incubation for one day, according to certain embodiments.
Figure 2B:
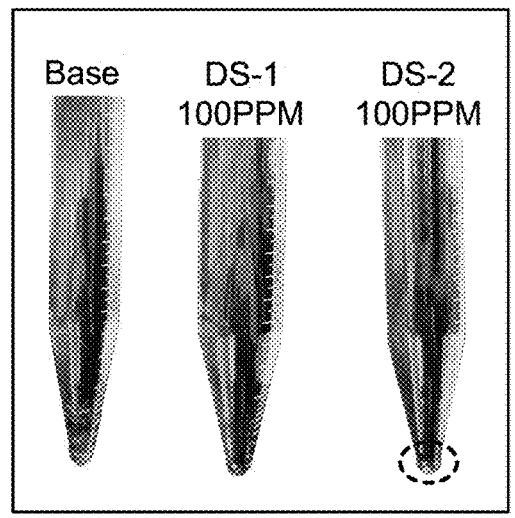
FIG. 2B illustrate sequential photographs documenting a visual progression of scale formation in the presence of dicationic surfactants at a concentration of 100 ppm, after incubation for seven days, according to certain embodiments.
Figure 3A:
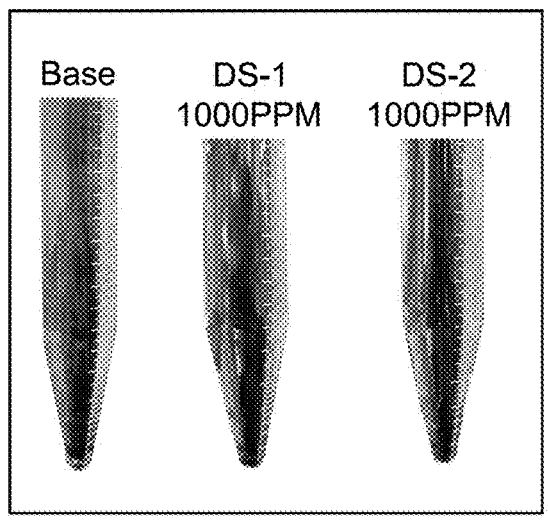
FIG. 3A illustrate sequential photographs documenting a visual progression of scale formation in the presence of dicationic surfactants at a concentration of 1000 ppm, after incubation for one day, according to certain embodiments.
Figure 3B:
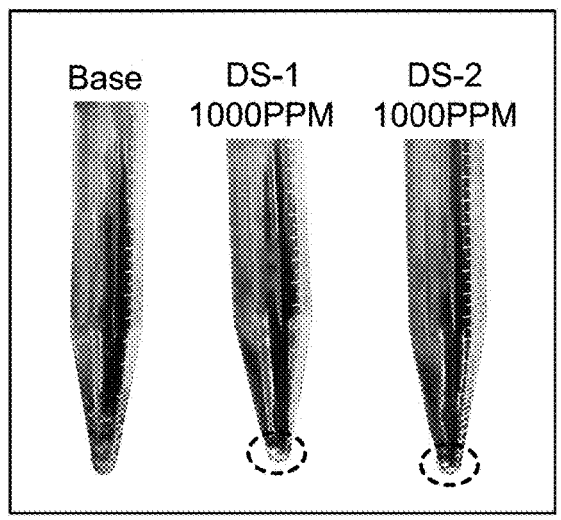
FIG. 3B illustrate sequential photographs documenting a visual progression of scale formation in the presence of dicationic surfactants at a concentration of 1000 ppm, after incubation for seven days, according to certain embodiments.

In order to assess the scale inhibition performance of the surfactants, a control experiment was first conducted by mixing synthetic seawater and synthetic formation water in a 1:1 volumetric ratio, in the absence of any chemical additive. Under the above-described untreated condition, needle-like sulfate scale crystals began to form within 24 hours, with progressive scale accumulation observed over a seven-day period, as shown in FIGS. 2A-2B. For comparison, the synthesized surfactants DS-1 and DS-2 were evaluated under identical conditions at two concentrations including 100 ppm and 1000 ppm. At both concentrations, DS-1 remained optically clear after 24 hours of exposure at 90° C., indicating the absence of visible precipitation or scale formation. Notably, at the lower concentration of 100 ppm, DS-1 maintained the clarity throughout the entire seven-day aging period. At 1000 ppm, only a minimal amount of precipitate was observed, which remained sufficiently dispersed to pass through a 5-micron filter paper, suggesting limited particulate formation and continued inhibition effectiveness. The observed findings imply that DS-1 is capable of preventing sulfate scale nucleation and growth over extended timeframes, even at reduced concentrations.

The performance of DS-2 was initially comparable to that of DS-1 across both test concentrations during the first 24-hour interval. However, after one week of aging at 90° C., a trace amount of precipitation was detected in the 1000 ppm DS-2 sample, while the 100 ppm sample exhibited only negligible signs of particulate matter, the results of both DS-1 and DS-2 are listed in Table 2. The morphology of the precipitates observed in the surfactant-treated samples differed significantly from the crystalline structures found in the control sample. Specifically, whereas the control condition produced elongated, needle-like crystals characteristic of sulfate scale, the treated samples exhibited rounded particulates resembling halite-like morphologies. The described distinction is visually demonstrated in FIGS. 2A-2B and FIGS. 3A-3B, which present a side-by-side comparison of sample appearance over time.

These results indicate that both DS-1 and DS-2 exhibit a concentration-dependent inhibition effect, with superior inhibition observed at the lower concentration of 100 ppm. The findings further suggest that minimal surfactant quantities may be sufficient to achieve effective scale control, supporting the application of DS-1 and DS-2 as cost-efficient chemical additives for sulfate scale mitigation in high-temperature oilfield operations.

TABLE 2

Scale inhibition assessment of dicationic surfactants (DS-1 and DS-2) at 90° C. acrossvarying concentrations.

| Formulations | Surfactant Concentrations | Temperature | 1 day | 7 days |
|---|---|---|---|---|
| Base (SW: FW) | — | 90° C. | Needle shaped scale | Needle shaped scale |
| Surfactant, DS-1 | 100 ppm | | No scale or precipitation | No scale or precipitation |
| | 1000 ppm | | No scale or precipitation | Negligible precipitation |
| Surfactant, DS-2 | 100 ppm | | No scale or precipitation | Negligible precipitation |
| | 1000 ppm | | No scale or precipitation | Negligible precipitation |

The aspects of the present disclosure relate to the aqueous injection fluid for the treatment of a subterranean hydrocarbon-bearing formation. The present disclosure addresses operational challenges associated with the formation of sulfate scales particularly calcium sulfate ($CaSO_4$) in anhydrite form within high-pressure, high-temperature (HPHT) oilfield environments. The scale-forming reactions, which result from the incompatibility of sulfate-rich seawater and divalent cation-rich formation water, are known to cause flow obstruction and equipment degradation under elevated thermal conditions. The disclosed dicationic surfactants were synthesized to exhibit solubility in seawater, distilled water, and formation water, and possess critical micelle concentrations of 0.019 $mmol \cdot L^{-1}$ and 0.016 $mmol \cdot L^{-1}$ for DS-1 and DS-2, respectively. Thermogravimetric analysis confirmed high decomposition temperatures of 282° C. and 280° C., respectively, for DS-1 and DS-2, demonstrating thermal stability well beyond typical reservoir temperatures. Under static test conditions at 90° C. over seven days, DS-1 in particular maintained inhibition activity at concentrations as low as 100 ppm, with minimal particulate presence and no needle-like sulfate scale observed. DS-2 exhibited comparable short-term inhibition, although limited precipitation was noted at higher concentration after extended thermal exposure. The described outcomes correlate inhibition efficiency with surfactant concentration, suggesting that reduced dosing may yield optimal scale control. The structural variation, specifically, a butane spacer in DS-1 versus an ether spacer in DS-2 was found to influence scale inhibition performance, particularly in high-salinity brines where traditional surfactants are prone to precipitation. The use of DS-1 and DS-2 minimizes reliance on mechanical removal or chemically aggressive scale treatments, reducing intervention frequency, treatment cost, and equipment wear. The aqueous compositions disclosed herein support continuous field operation while reducing expenditures associated with remediation and shutdown. Additionally, the use of locally derived chemical inputs supports regional sourcing strategies and contributes to sustainability objectives in alignment with broader industrial localization initiatives and long-term economic diversification goals.

Numerous modifications and variations of the present disclosure are possible in light of the above teachings. It is therefore to be understood that within the scope of the appended claims, the invention may be practiced otherwise than as specifically described herein.

The invention claimed is:

1. A method for inhibiting sulphate scale formation in a well-bore disposed in a hydrocarbon-bearing subterranean formation, comprising:
   injecting into the well-bore an aqueous injection fluid comprising:
   water, and
   at least one water soluble cationic surfactant having a general formula (DCS):

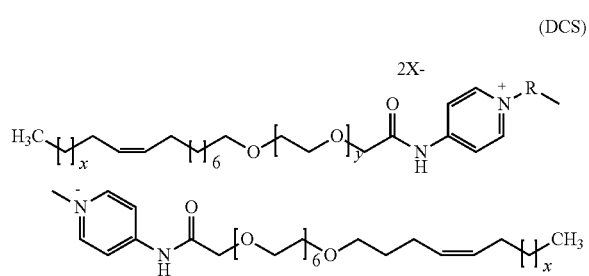

wherein R is $C_2$-$C_4$ alkylene which may have one or more —O—, —S— or —S(O)$_2$O— groups;
$X^-$ is halide;
x is an integer of from 2 to 10; and
y is an integer of from 2 to 10.

2. The method according to claim 1, wherein the water is at least one selected from the group consisting of fresh water, seawater, brackish water, and formation water.

3. The method according to claim 1, wherein the aqueous injection fluid has a total dissolved solids content of at least about 50,000 parts per million by weight.

4. The method according to claim 1, wherein the aqueous injection fluid has a total dissolved solids content of from about 50,000 to about 300,000 parts per million by weight.

5. The method according to claim 1, wherein the water soluble cationic surfactant (DCS) has a critical micelle concentration of from about 0.015 to about 0.025 mmolL$^{-1}$.

6. The method according to claim 1, wherein the water soluble cationic surfactant (DCS) has a thermal degradation temperature of at least about 250° C., as determined by Thermogravimetric Analysis.

7. The method according to claim 1, wherein the water soluble cationic surfactant (DCS) has a thermal degradation temperature of from about 250° C. to about 300° C., as determined by Thermogravimetric Analysis.

8. The method according to claim 1, wherein the water soluble cationic surfactant (DCS) has a thermal degradation temperature of from about 270° C. to about 300° C., as determined by Thermogravimetric Analysis.

9. The method according to claim 1, wherein the aqueous injection a concentration of the at least one water soluble cationic surfactant (DCS) is from about 50 to about 2,500 parts per million by weight.

10. The method according to claim 1, wherein the aqueous injection fluid a concentration of the at least one water soluble cationic surfactant (DCS) is from about 50 to about, 1500 parts per million by weight.

11. The method according to claim 1, wherein
R is $C_2$-$C_4$ alkylene;
$X^-$ is $Cl^-$ or $Br^-$;
x is an integer of from 3 to 10; and
y is an integer of from 3 to 10.

12. The method according to claim 11, wherein $X^-$ is $Br^-$.

13. The method according to claim 1, wherein:
R is $C_2$-$C_4$ alkylene which is interrupted by —O—;
$X^-$ is $Cl^-$ or $Br^-$;
x is an integer of from 3 to 10; and,
y is in an integer of from 3 to 10.

14. The method according to claim 13, wherein $X^-$ is $Br^-$.

15. The method according to claim 1, wherein the well-bore has a static bottom hole temperature of at least about 100° C.

16. The method according to claim 1, wherein the well-bore has a static bottom hole temperature of at least about 150° C.

17. The method according to claim 1, wherein the well-bore has a bottom hole pressure of at least about 69 MPa.

18. The method according to claim 1, wherein the well-bore has a bottom hole pressure of from about 69 to about 138 MPa.

* * * * *